United States Patent
Guo et al.

(10) Patent No.: US 10,638,142 B2
(45) Date of Patent: Apr. 28, 2020

(54) VIDEO CODING AND DECODING METHODS AND APPARATUS

(71) Applicant: Hangzhou Hikvision Digital Technology Co., Ltd., Hangzhou (CN)

(72) Inventors: Bin Guo, Hangzhou (CN); Weiwei Cai, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 120 days.

(21) Appl. No.: 15/569,840

(22) PCT Filed: Dec. 21, 2015

(86) PCT No.: PCT/CN2015/098060
§ 371 (c)(1),
(2) Date: Oct. 27, 2017

(87) PCT Pub. No.: WO2016/173277
PCT Pub. Date: Nov. 3, 2016

(65) Prior Publication Data
US 2018/0131950 A1    May 10, 2018

(30) Foreign Application Priority Data
Apr. 30, 2015    (CN) .......................... 2015 1 0216640

(51) Int. Cl.
*H04N 19/23*    (2014.01)
*H04N 19/27*    (2014.01)
(Continued)

(52) U.S. Cl.
CPC ............. *H04N 19/23* (2014.11); *H04N 19/25* (2014.11); *H04N 19/27* (2014.11);
(Continued)

(58) Field of Classification Search
CPC .. H04N 19/117; H04N 19/139; H04N 19/167; H04N 19/17; H04N 19/23;
(Continued)

(56) References Cited

U.S. PATENT DOCUMENTS

| 2010/0158099 A1* | 6/2010 | Kalva | .............. H04N 21/23412 |
| | | | 375/240.01 |
| 2011/0075842 A1* | 3/2011 | Le Barz | ............... H04N 7/1675 |
| | | | 380/212 |
| 2015/0078444 A1* | 3/2015 | Hunag | ................. G06K 9/6262 |
| | | | 375/240.08 |

FOREIGN PATENT DOCUMENTS

| CN | 102006473 A | * | 4/2011 |
| CN | 102006473 A | | 4/2011 |

(Continued)

OTHER PUBLICATIONS

International Search Report for PCT/CN2015/098060 dated Mar. 31, 2016 (4 pages total including English translation).
(Continued)

*Primary Examiner* — Md N Haque
(74) *Attorney, Agent, or Firm* — Shumaker, Loop & Kendrick, LLP

(57) ABSTRACT

The present application provides a video encoding method, decoding method and devices thereof. The video encoding device includes a video capturing unit for capturing a video image; a processing unit for performing compression encoding on a background image in the video image to obtain video compression data and for structuralizing a foreground moving object in the video image to obtain foreground object metadata; a data transmission unit for transmitting the video compression data and the foreground object metadata, wherein the foreground object metadata is data that stores video structuralized semantic information. In the case that the moving objects are large in quantity or in size, the (Continued)

amount of video data can be effectively reduced and the limitation of network bandwidth during transmission can be mitigated.

14 Claims, 8 Drawing Sheets

(51) Int. Cl.
*H04N 19/25* (2014.01)
*H04N 19/463* (2014.01)
*H04N 19/527* (2014.01)
*H04N 19/54* (2014.01)
*H04N 19/85* (2014.01)
*H04N 19/167* (2014.01)
*H04N 19/139* (2014.01)
*H04N 19/117* (2014.01)
*H04N 19/17* (2014.01)

(52) U.S. Cl.
CPC ......... *H04N 19/463* (2014.11); *H04N 19/117* (2014.11); *H04N 19/139* (2014.11); *H04N 19/167* (2014.11); *H04N 19/17* (2014.11); *H04N 19/527* (2014.11); *H04N 19/54* (2014.11); *H04N 19/85* (2014.11)

(58) Field of Classification Search
CPC ...... H04N 19/25; H04N 19/27; H04N 19/463; H04N 19/527; H04N 19/54; H04N 19/85
See application file for complete search history.

(56) References Cited

FOREIGN PATENT DOCUMENTS

| CN | 103179402 A | 6/2013 |
| CN | 103475882 A | 12/2013 |
| CN | 104301735 A | 1/2015 |

OTHER PUBLICATIONS

Ming-Ho Hsiao et al., "Object-Based Video Streaming Technique With Application to Intelligent Transportation Systems", Proceedings of the 2004 IEEE International Conference on Networking Sensing & Control Taipei, Taiwan, Mar. 21-23, 2004, vol. 1, pp. 315-320, XP010706169.

Nicholas A. Mandellos et al., "A background subtraction algorithm for detecting and tracking vehicles", Expert Systems with Applications, vol. 38, No. 3, Mar. 1, 2011, pp. 1619-1631, XP027456205.

European Search Report for EP 151890651.1 dated Aug. 18, 2009 (9 pages).

\* cited by examiner

VIDEO CODING AND DECODING METHODS AND APPARATUS

The present application claims the priority to a Chinese patent application No. 201510216640.0 filed with the State Intellectual Property Office of People's Republic of China on Apr. 30, 2015 and entitled "Video encoding method, decoding method and devices thereof," which is incorporated herein by reference in its entirety.

TECHNICAL FIELD

The present application relates to the field of video surveillance, and in particular to a video encoding method, decoding method and devices thereof.

BACKGROUND

With the continuous development of multimedia information technology, video information emerges in large quantity. Video data, as an integrated media to express information, has become an important information carrier in our real life.

Take an image-capturing monitoring device for example. The clearer the captured image is, the more video data is generated—if the video data is transmitted without having been processed, it will take up a lot of network bandwidth—and the larger the storage space required to store the video data will be. Thus, whether it is for network transmission or data storage, the cost incurred is very high. Therefore, in the prior art, a method has been proposed in which video data is encoded through compression encoding before the video file is transmitted, thus reducing the network bandwidth occupied during the video data transmission and reducing cost.

Although this method reduces network bandwidth occupied during transmission to a certain extent, when moving objects in video images are relatively large in quantity and in size, the network bandwidth occupied will still be relatively large, since this method still uses traditional video encoding methods to encode all the video data before transmitting the encoded data.

Therefore, it is urgently needed to propose a solution that can effectively reduce the amount of video data and mitigate the limitation of network bandwidth during transmission when moving objects are relatively large in quantity or in size.

SUMMARY

One of the technical problems to be solved by the present application is to provide a video encoding device that can effectively reduce the amount of video data and mitigate the limitation of network bandwidth during transmission when moving objects are relatively large in quantity or in size.

In order to solve the above-mentioned technical problem, embodiments of the present application first provide a video encoding device including: a video capturing unit for capturing a video image; a processing unit for performing compression encoding on a background image in the video image to obtain video compression data, and for structuralizing a foreground moving object in the video image to obtain foreground object metadata; a data transmission unit for transmitting the video compression data and the foreground object metadata, wherein the foreground object metadata is data that stores video structuralized semantic information.

In an embodiment, the processing unit is further for establishing a background model of the video image and detecting the foreground moving object based on the established background model to separate the background image and the foreground moving object in a current frame of the video image.

In an embodiment, the data transmission unit transmits the video compression data corresponding to the background image at a set time interval, and transmits the foreground object metadata corresponding to the foreground moving object in real time.

In an embodiment, when the processing unit structuralizes the foreground moving object in the video image, the structuralization algorithm used includes structuralization algorithms that do not set object type and structuralization algorithms that set object type.

According to another aspect of the present application, there is also provided a video decoding device comprising: a data receiving unit for receiving video compression data and foreground object metadata; a processing unit for decoding the video compression data and interpreting the foreground object metadata.

In an embodiment, the video decoding device further includes a storage unit for storing images, the processing unit further selects a corresponding foreground object image from the storage unit as a foreground moving object based on information of the foreground object metadata to realize the interpretation of the foreground object metadata.

In an embodiment, the processing unit realizes the interpretation of the foreground object metadata by superimposedly plotting the foreground moving object described by the foreground object metadata on a decoded background image by means of display plotting technique based on the information of the foreground object metadata.

In an embodiment, the video decoding device further includes a video display unit for synthetically displaying the decoded background image and the interpreted foreground moving object.

According to another aspect of the present application, there is also provided a video transmission and display system including: a video encoding device as described above, and a video decoding device as described above.

According to another aspect of the present application, there is also provided a video encoding method, including: capturing a video image to be transmitted; performing compression encoding on a background image in the video image to obtain video compression data, and structuralizing a foreground moving object in the video image to obtain foreground object metadata; transmitting the video compression data and the foreground object metadata, wherein the foreground object metadata is data that stores video structuralized semantic information.

In an embodiment, the video encoding method further includes: establishing a background model of the video image and detecting the foreground moving object based on the established background model to separate the background image and the foreground moving object in a current frame of the video image.

In an embodiment, the video compression data corresponding to the background image is transmitted at a set time interval, and the foreground object metadata corresponding to the foreground moving object is transmitted in real time.

In an embodiment, when structuralizing the foreground moving object in the video image, the structuralization algorithms used include structuralization algorithms that do not set object type and structuralization algorithms that set object type.

According to another aspect of the present application, there is also provided a video decoding method, including: receiving video compression data and foreground object metadata; decoding the video compression data and interpreting the foreground object metadata; synthetically displaying a decoded background image and a interpreted foreground moving object.

In an embodiment, synthetically displaying the decoded background image and the interpreted foreground moving object further includes: selecting a corresponding foreground object image from pre-stored images as the foreground moving object based on information of the foreground object metadata, and synthetically displaying the foreground object image and the decoded background image.

In an embodiment, synthetically displaying the decoded background image and the interpreted foreground moving object further includes: superimposedly plotting the foreground moving object described by the foreground object metadata on the decoded background image by means of display plotting technique based on the information of the foreground object metadata.

According to another aspect of the present application, there is also provided a video encoding method for highways, including: capturing a video image on a highway; separating a frame of the video image into a background image containing a still scene and a foreground image containing a moving object vehicle according to a background model; performing compression encoding on the background image into video compression data in form of digital array, and structuralizing the foreground image of the moving object vehicle to obtain foreground object metadata, wherein the foreground object metadata is data that stores video structuralized semantic information; mixing the video compression data and the foreground object metadata to obtain a mixed stream of video data with metadata and transmitting the mixed stream.

In an embodiment, the foreground object metadata contains at least: vehicle type, vehicle color, vehicle make, vehicle model, license plate number, position of the foreground object in the frame of the video image, and time of the frame of the video image.

According to another aspect of the present application, there is also provided a video decoding method for highways, including: analyzing a mixed stream of video data with metadata to obtain video compression data and foreground object metadata; decoding the video compression data to obtain a background image, and interpreting the foreground object metadata to obtain a foreground image; superimposing the foreground image on a corresponding position of the background image based on position information and time information in the metadata, performing synthetic display to reproduce the captured video image.

In an embodiment, interpreting the foreground object metadata to obtain the foreground image includes: selecting a corresponding foreground object image as a foreground moving object based on information of the foreground object metadata, or superimposedly plotting a foreground moving object described by the foreground object metadata on a decoded background image by means of display plotting technique based on information of the foreground object metadata.

In order to solve the above-mentioned technical problem, embodiments of the present application also provide a storage medium, wherein, the storage medium is for storing an application program for performing a video encoding method described in the present application when being executed.

In order to solve the above-mentioned technical problem, embodiments of the present application also provide a storage medium, wherein, the storage medium is for storing an application program for performing a video decoding method described in the present application when being executed.

In order to solve the above-mentioned technical problem, embodiments of the present application also provide a storage medium, wherein, the storage medium is for storing an application program for performing a video encoding method for highways described in the present application when being executed.

In order to solve the above-mentioned technical problem, embodiments of the present application also provide a storage medium, wherein, the storage medium is for storing an application program for performing a video decoding method for highways described in the present application when being executed.

In order to solve the above-mentioned technical problem, embodiments of the present application also provide an application program, wherein, the application program is for performing a video encoding method described in the present application when being executed.

In order to solve the above-mentioned technical problem, embodiments of the present application also provide an application program, wherein, the application program is for performing a video decoding method described in the present application when being executed.

In order to solve the above-mentioned technical problem, embodiments of the present application also provide an application program for performing a video encoding method for highways described in the present application when being executed.

In order to solve the above-mentioned technical problem, embodiments of the present application also provide an application program for performing a video decoding method for highways described in the present application when being executed.

In order to solve the above-mentioned technical problem, embodiments of the present application also provide an encoding device, the encoding device including a processor, a memory, a communication interface and a bus;

the processor, the memory and the communication interface are connected via the bus and communicate with each other;

the memory stores executable program codes;

the processor runs a program corresponding to the executable program codes by reading the executable program codes stored in the memory for:

capturing a video image to be transmitted; performing compression encoding on a background image in the video image to obtain video compression data, and structuralizing a foreground moving object in the video image to obtain foreground object metadata; transmitting the video compression data and the foreground object metadata, wherein the foreground object metadata is data that stores video structuralized semantic information.

In order to solve the above-mentioned technical problem, embodiments of the present application also provide a decoding device, the decoding device including a processor, a memory, a communication interface and a bus;

the processor, the memory and the communication interface are connected via the bus and communicate with each other;

the memory stores executable program codes;

the processor runs a program corresponding to the executable program codes by reading the executable program codes stored in the memory for:

receiving video compression data and foreground object metadata; decoding the video compression data, and interpreting the foreground object metadata; synthetically displaying a decoded background image and an interpreted foreground moving object.

In order to solve the above-mentioned technical problem, embodiments of the present application also provide an encoding device, the encoding device including a processor, a memory, a communication interface and a bus;

the processor, the memory and the communication interface are connected via the bus and communicate with each other;

the memory stores executable program codes;

the processor runs a program corresponding to the executable program codes by reading the executable program codes stored in the memory for:

capturing a video image on a highway; separating a frame of the video image into a background image containing a still scene and a foreground image containing a moving object vehicle according to a background model; performing compression encoding on the background image into video compression data in form of digital array, and structuralizing the foreground image of the moving object vehicle to obtain foreground object metadata, wherein the foreground object metadata is data that stores video structuralized semantic information; mixing the video compression data and the foreground object metadata to obtain a mixed stream of video data with metadata and transmitting the mixed stream.

In order to solve the above-mentioned technical problem, embodiments of the present application also provide a decoding device, the decoding device including a processor, a memory, a communication interface and a bus;

the processor, the memory and the communication interface are connected via the bus and communicate with each other;

the memory stores executable program codes;

the processor runs a program corresponding to the executable program codes by reading the executable program codes stored in the memory for:

analyzing a mixed stream of video data with the metadata to obtain video compression data and foreground object metadata; decoding the video compression data to obtain a background image, and interpreting the foreground object metadata to obtain a foreground image; superimposing the foreground image on a corresponding position of the background image based on position information and time information in the metadata, performing synthetic display to reproduce the captured video image.

One or more embodiments of the above-described solution can have the following advantages or beneficial effects compared to the prior art.

The method of the present application is a video transmission method based on structuralization of foreground moving objects (or foreground objects), which is mainly applied in the case of video monitoring of a fixed scene and the overall situation in the scene, such as monitoring of traffic on highways. By performing compression encoding on the background in the video image and structuralizing the foreground objects and then transmitting the processed video compression data and metadata, data traffic can be effectively reduced and network bandwidth can be saved.

Other features and advantages of the present application will be described in the following specification, and will partly become apparent from the specification, or will be understood through the implementation of the technical solution of the application. The objectives and other advantages of the present application can be achieved and obtained through the structures and/or processes specifically pointed out in the specifications, the claims, and the drawings.

BRIEF DESCRIPTION OF THE DRAWINGS

In order to more clearly describe the technical solutions of the embodiments of the present application and the prior art, a brief introduction of the drawings required in the embodiments and the prior art is made below. Obviously, the drawings described below are just some embodiments of the present application and further drawings can be obtained by those of ordinary skills in the art without any creative effort based on these drawings.

DETAILED DESCRIPTION

Implementation modes of the present application will be described below in detail in combination with the drawings and the embodiments. Thus, how the present application solves the technical problems with technical means and achieves the corresponding technical effects can be fully understood and implemented accordingly. The embodiments of the present application and various features of the embodiments can be combined with each other provided that they do not conflict with each other, and the resulting technical solutions are all within the scope of protection of the present application.

In addition, the steps shown in the flowcharts in the figures can be executed in a computer system in, e.g., a set of computer-executable instructions. Furthermore, although logical sequences are shown in the flow charts, in some cases, the steps shown or described can be executed in an order different from that described herein.

The terms referred to in the present application will be described below. "Background" refers to a pixel area in a video image that remains stable relative to a motion foreground for a certain period of time. "Foreground" refers to a pixel area of a video image that undergoes certain changes relative to the motion background. "Structuralizing" refers to the extraction of semantic information in discrete digital image arrays through video content analysis (e.g., structuralization description for a frame of image: "there is a red car in the image"). "Metadata" refers to data that stores structuralizing information of a video.

In embodiments of the present application, the transmitted video data can be a video, a static image, an animation, or a combination of the above data, which is not limited.

The video transmission method of the present application is a video transmission method based on the structuralization of foreground moving objects, which is mainly applied in the case of video monitoring of a fixed scene and the overall situation in the scene, for example, the monitoring of traffic of a highway. By performing compression encoding on the background image in a video image and structuralizing the foreground object and then transmitting the video compression code and the metadata obtained after the processing, data traffic can be effectively reduced and network bandwidth can be saved.

Embodiment 1

Figure 1:
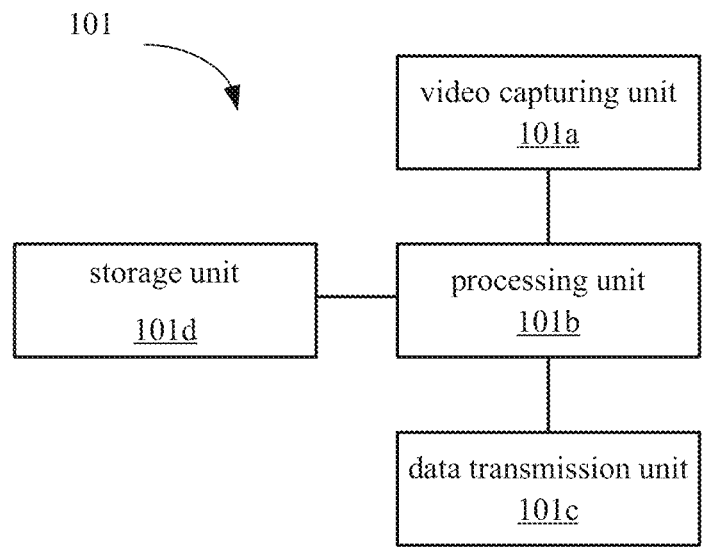
FIG. 1 is a schematic structural view of a video encoding device according to an embodiment of the present application.

FIG. 1 is a schematic structural view of a video encoding device according to an embodiment of the present application. The video encoding device 101 of the present embodiment can transmit video data in a wired or wireless manner.

The device 101 includes: a video capturing unit 101a, a processing unit 101b and a data transmission unit 101c. The video capturing unit 101a is for capturing a video image to be transmitted. The processing unit 101b performs compression encoding on a background image in the video image to be transmitted to obtain video compression data, and structuralizes a foreground moving object (or foreground object) in the video image to obtain foreground object metadata. The data transmission unit 101c transmits the video compression data and the foreground object metadata.

The video capturing unit 101a can be, for example, a video capturing card, which mainly converts an analog video output from a video monitoring device, such as an analog camera and a video recorder, through an analog-to-digital converter, into binary digital information to be stored as an editable digital video file.

In order to process the background image and the foreground object in the video image separately, the processing unit 101b establishes a background model of the video image and detects the foreground moving object based on the established background model to separate the background image and the foreground object in a current frame of the video image.

It should be noted that both the background and the foreground are relative concepts. Take a highway as an example. When one is concerned about cars passing on the highway, the cars are the foreground, and the pavement and the surrounding environment are the background; when one is concerned about a pedestrian intruding into the highway, the intruder is the foreground, and other things, including cars, become the background.

Moreover, foreground object detection is the basis of the object analysis. A common method of foreground object detection is the background subtraction method. The key of the background subtraction method is how to establish a background model from the video sequence. A variety of background modeling methods have been proposed for different application environments, in which the commonly used are single Gaussian model-based method, the hybrid Gaussian model-based method, the statistics-based background modeling method, and the codebook-based modeling method.

In the present embodiment, the processing unit 101b preferably uses a codebook-based modeling method, in which the basic idea of modeling is to first generate an initial codebook based on a video sequence, and to perform temporal filtering with a parameter "the longest time of absence" in a code word. The purpose of doing this is to filter out the code words in the codebook that are likely to represent foreground images. Finally, through spatial filtering, the code words representing background status that appear relatively infrequently that have been improperly deleted in the previous step are restored into the codebook. A background model can be established by the above method.

After the background model has been established by the processing unit 101b, foreground moving object detection is performed based on the background model, that is, the foreground moving object is extracted from the background image in the current frame of the video image.

Since the video monitoring device, such as an analog camera, does not move during the entire monitoring process in the present embodiment, the processing unit 101b preferably applies the background difference method to detect foreground objects. Specifically, the processing unit 101b subtracts the background model from the current frame of the video image, and if the interpolation of a pixel is greater than a certain threshold, it is determined that the pixel belongs to a foreground moving object; otherwise, it belongs to the background image. By using the difference between the current frame of the video image and the background model to detect a motion area, it is generally able to provide relatively complete feature data, and this method is simple to operate, and can completely and accurately separate out a moving object in a fixed background.

It is easy to understand that in the case where the camera has moved (for example, moved in translation, rotation or multiple degrees of freedom) in the course of monitoring, a moving object detection method in a dynamic background, such as the matching method, the optical flow method or the global motion estimation method, can be employed, which will not be described here.

In general, the foreground object obtained will contain a lot of noise. Thus, the processing unit 101b can also eliminate the noise by performing an opening operation and a closing operation on the foreground image and then discarding the smaller contour. The processing unit 101b can separate well the background image and the foreground object of the current frame of the video image by the above operations. After that, the processing unit 101b performs compression encoding on the background image in the video and structuralizes the foreground object in the video.

As for the method of performing compression encoding on the background image, Huffman coding, predictive coding, transform coding, and the like can be used. Since the prior art is relatively mature, it is not described here. By performing compression encoding on the background image, redundant data can be eliminated to reduce the amount of data required to represent the digital image, facilitating the storage and transmission of the image, and reducing the storage space and the transmission bandwidth.

On the other hand, the processing unit 101*b* also needs to structuralize the foreground object in the video to obtain the foreground object metadata.

It should be noted that the metadata is not a large amount of video data, but rather information that describes semantically the foreground object in the video. For example, the foreground moving object is a car on a road, and the metadata obtained by structuralizing the object can be shown in the following table.

| Semantics | Description |
|---|---|
| Object's Position | Relative position in the video image |
| Object's Type | Video object type, which can be divided into people, cars and other types. |
| Time Object Appeared | Global time such as year, month, day, hour, minute, second, millisecond, and so on |
| Object's Moving Direction | Moving direction of the object, such as east, west, south, north and so on |
| Vehicle Type | Type of the vehicle, such as sedans, passenger cars, and so on |
| Vehicle Body Color | Color of the vehicle, such as red, white and so on |
| Vehicle Make | Brand of the vehicle, such as Brilliance, BMW and so on |
| Vehicle Sub-brand | Sub-brand of the vehicle, such as Brilliance Wagon and so on |
| License Plate Number | License plate number, composed of letters, numbers and Chinese characters |
| ... | ... |

It should be noted that the extent to which the foreground object can be structuralized and how much metadata is obtained depend on multiple factors such as video environment, video resolution, clarity, and the algorithm of structuralizing analysis. The algorithm for structuralizing the video itself, and the specific definition of metadata are not the focus of this solution, and any structuralization algorithm that can obtain the above type of metadata can be used.

On the basis of performing compression encoding on the background image by the processing unit 101*b*, the foreground moving object with a larger amount of data compared to the background image is structuralized. In this way, since the metadata obtained is not video data, but structuralized semantic information, which can be transmitted as text or design data structures in the form of binary data, compared to using video encoding technology to compress the entire video image in the prior art, the amount of data is greatly reduced, and network bandwidth consumption can be further reduced.

The video transmission unit 101*c* of the video transmission device 101 transmits the video compression data and the foreground object metadata. Regarding the transmission mode, the above video compression data encoded through compression encoding and structuralized foreground object metadata can be mixed into new video data, and then the new video data is transmitted out in a wireless or wired way. Alternatively, the data transmission unit 101*c* transmits the above video compression data encoded through compression encoding and the structuralized foreground object metadata directly as, respectively, two independent types of data in a wireless or wired way.

It should be noted that when the transmission mode is the second type, that is, transmitting as independent data respectively, since the video scene of the present embodiment is fixed, the video compression data needs to be transmitted only once or once every set time interval. The foreground moving object will have more or less differences in different frames of images, thus the foreground object metadata needs to be transmitted in real time. Since it is not necessary to perform compression encoding on and transmit the background image of each frame of the video image in real time, not only the data processing load of the processing unit is reduced, but also the network resources occupied by the data transmission can be reduced.

In addition, the video transmission device 101 of the present embodiment can further include a storage unit that stores the background video compression data and the foreground object metadata, which can be taken out from the storage unit by the data transmission unit 101*c* when transmission is needed. The specific type of the storage unit is not limited here.

Figure 2:
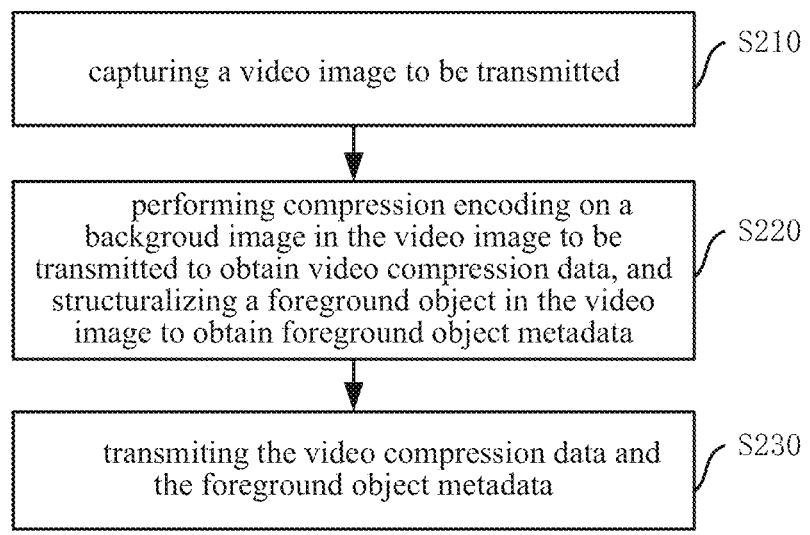
FIG. 2 is a schematic flowchat of a video encoding method according to an embodiment of the present application.

FIG. 2 shows a flow process of a video encoding method according to an embodiment of the present application. The method can be performed in the above-described device, and the method includes the following steps.

In step S210, the video capturing unit 101*a* captures a video image to be transmitted.

In step S220, the processing unit 101*b* performs compression encoding on a background image in the video image to be transmitted to obtain video compression data, and structuralizes a foreground moving object (or foreground object) in the video image to obtain foreground object metadata.

The flow process of processing the metadata of the object type obtained by the processing unit 101*b* is explained in detail below, using a structuralization algorithm that does not set the object type as an example.

First, the processing unit 101*b* performs foreground detection.

Foreground detection refers to determining foreground points in the current input image (the pixel points that move in the background). To determine whether a pixel point is moving, the difference between the current input pixel point and the background image pixel point needs to be calculated, and when the difference exceeds a set range, the point is considered as a foreground point.

Specifically, suppose the current pixel point is X, then:

$$F(x) = \begin{cases} 0, & \text{if } (x - b(x)) < T \\ 1, & \text{if } (x - b(x)) >= T \end{cases}$$

wherein x denotes the pixel value of the pixel point X, b(x) denotes the pixel value of the background image corresponding to the pixel point X, and T denotes a set threshold. If the result is 1, the pixel point X is a foreground point.

By determining the difference between each pixel point in the input image and its corresponding background pixel, we can determine which points of the input image are foreground points and which points are stationary background points.

Figure 3:
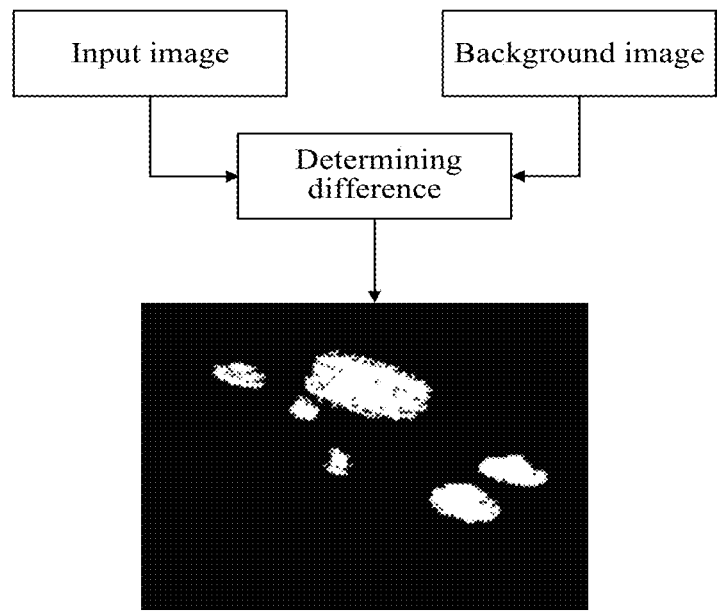
FIG. 3 is a schematic flowchart of performing foreground detection processing according to an embodiment of the present application.

The background image is obtained by maintaining a background model that combines multiple kinds of image information, which can absorb lighting changes in the environment, and can filter out disturbances such as rain and snow. The results of the foreground detection are as shown in FIG. 3, where the white dots in the foreground image indicate the foreground points and the black dots indicate the background points.

Then, the processing unit 101*b* performs foreground point mass marking processing.

Figure 4:
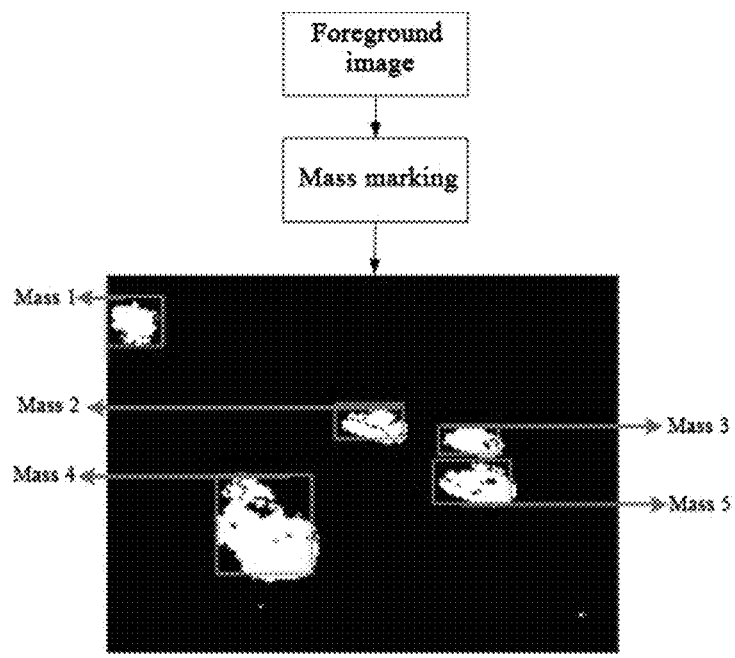
FIG. 4 is a schematic flowchart of performing mass marking processing according to an embodiment of the present application.

The foreground detection stage can only determine whether a pixel point in the input image is a foreground point (moving point), but does not define the attribution of each foreground point. The foreground points corresponding to a moving object are usually spatially continuous and appear as a foreground mass in the image, and the contours of these masses are usually closed. Mass marking can be regarded as a process of contour searching and contour tracing, with each mass corresponding to a unique contour, and the individual foreground masses in the foreground image can be marked by searching for these contours. The results of the mass marking are as shown in FIG. 4, and five masses, namely masses 1 to 5, are obtained.

Next, the processing unit 101*b* performs object tracking and extraction processing.

In practical applications, not all foreground masses are the moving objects of concern for intelligent video analysis. In many cases, background disturbances in the monitored scene all generate foreground masses in the foreground detection output. If this part of false objects is not filtered, a large amount of false alarm information will be generated. To determine whether a foreground mass is a real moving object, it can usually proceed as follows:

A generated foreground mass is traced and the trajectory of the mass is recorded. If the mass corresponds to a real moving object, it should satisfy:

1. The length of the trajectory should meet the requirements, and an overly short trajectory indicates that it is a short time disturbance in the background.
2. The trajectory of the mass should conform to the motion characteristics of a normal moving object, and the trajectory should be regular rather than chaotic.
3. The moving speed of the mass should not be too high.

After disturbance filtering is performed on a foreground mass, object tracking is performed on it and the object is required to be initialized before being traced. The initialization steps include the following:

The trajectory information (the position information of the object at each time point) of the first 15 frames of the mass is saved, and the Kalman filter corresponding to the object is updated.

The YUV color histogram of the mass in the current image area is counted, and the histogram is saved as a characteristic template of the object.

Through mass detection and trajectory analysis, we define the moving object in the video image. The purpose of the object tracking is to establish the position correspondence (trajectory) of the object in time. The process of determining the position of the object in the current image is described as follows:

Using the kalman filter corresponding to the object, the moving position of the object is predicted. Information on the object's speed and direction is saved in the Kalman filter, and can be used to predict the moving position of the object at the next moment:

$$\text{state\_post} = T \times \text{state\_pre}$$

$$\text{state\_post} = \begin{bmatrix} x \\ y \end{bmatrix}, T = \begin{bmatrix} 1 & 0 & 1 & 0 & 0.5 & 0 \\ 0 & 1 & 0 & 0 & 0 & 0.5 \\ 0 & 0 & 1 & 0 & 1 & 0 \\ 0 & 0 & 0 & 1 & 0 & 1 \\ 0 & 0 & 0 & 0 & 1 & 0 \\ 0 & 0 & 0 & 0 & 0 & 1 \end{bmatrix}, \text{state\_pre} = \begin{bmatrix} x' \\ y' \\ vx' \\ vy' \\ ax' \\ ay' \end{bmatrix}$$

wherein state_post denotes the current predicted position, T denotes the kalman transmission matrix, and state_pre denotes the object's coordinates, speed and acceleration correction value of the kalman filter at a previous moment.

At the predicted position of the object, Mean Shift object tracking is performed. A search for foreground masses is performed at the final position of the Mean Shift tracking. If there are no foreground masses at that position, the tracking fails. If there is a foreground mass, the size and the center point position of the mass are used as the results of the object tracking.

The various parameters of the kalman filter and state_pre are corrected using the position information resulting from the object tracking. The YUV color histogram in the current range in which the object is located is counted, and is used to update the object's characteristic template, and the size of the object is updated.

At the resulting position of the tracking, the foreground image is extracted within the range defined by the object's size, which represents the position and shape information of the object.

The YUV color histogram represents the probability that each YUV value of the image appears in the image. Assuming there is a YUV value (y, u, v), the probability P(y,u,v) that it appears in the image is:

$$P(y, u, v) = \sum_{x=0}^{x=N} \sum_{y=0}^{y=M} I(YUV(x, y))/(M \times N)$$

$$\text{wherein } I(YUV(x, y)) = \begin{cases} 0, & \text{if } YUV(x, y) \neq (y, u, v) \\ 1, & \text{if } YUV(x, y) = (y, u, v) \end{cases}$$

YUV(x, y) denotes the YUV value of the image at position (x, y), and M and N respectively denote the height and the width of the image.

It requires 256×256×256=16777216 storage locations in total to represent the probabilities of various YUV values in the image, and requires a lot of storage space. Taking into account the independence of each component in the YUV space, here we give an approximate description of the color histogram:

$$P(y, u, v) = P(y) * P(u) * P(v)$$

$$P(y) = \sum_{x=0}^{x=N} \sum_{y=0}^{y=M} I(Y(x, y))/(M \times N)$$

$$\text{wherein } I(Y(x, y)) = \begin{cases} 0, & \text{if } Y(x, y) \neq y \\ 1, & \text{if } Y(x, y) = y \end{cases}$$

$$P(u) = \sum_{x=0}^{x=N} \sum_{y=0}^{y=M} I(U(x, y))/(M \times N)$$

$$\text{wherein } I(U(x, y)) = \begin{cases} 0, & \text{if } U(x, y) \neq u \\ 1, & \text{if } U(x, y) = u \end{cases}$$

U(x, y) denotes the value of the U component of the image at position (x, y).

$$P(v) = \sum_{x=0}^{x=N} \sum_{y=0}^{y=M} I(V(x, y))/(M \times N)$$

-continued $$\text{wherein } I(V(x, y)) = \begin{cases} 0, & \text{if } V(x, y) \neq v \\ 1, & \text{if } V(x, y) = v \end{cases}$$

V(x, y) denotes the value of the V component of the image at position (x, y), and M and N respectively denote the height and the width of the image.

Thus, we compress the color histogram, and it only requires 256+256+256=768 storage locations to describe a color histogram. The color histogram of an object is a compressed histogram calculated through joint probability distribution and occupies less RAM space than a traditional color histogram, and the amount of data involved in the operation is greatly reduced.

Next, the processing unit 101b performs size normalization of the object.

There will be relatively huge differences in the sizes of the moving objects obtained after object extraction and tracking. We need to normalize the sizes of the objects, namely, normalize the object images to an object template that is 40 pixels wide and 40 pixels high. In the process of scaling images, in order to preserve the aspect ratio of an object, a special scaling method is used: according to the aspect ratio of the object, different scaling factors are used for the width and height directions to ensure the consistency of the object's aspect ratio before and after the normalization. Assuming that currently there is an object, of which the width and height are w and h respectively, the size normalization is performed as follows:

if (w>h) scale_w=40/w
   scale_h=40/w
if (w<=h) scale_w=40/h
   scale_h=40/h wherein scale_w and scale_h represent the scaling ratios in width and height respectively.

Figure 5:
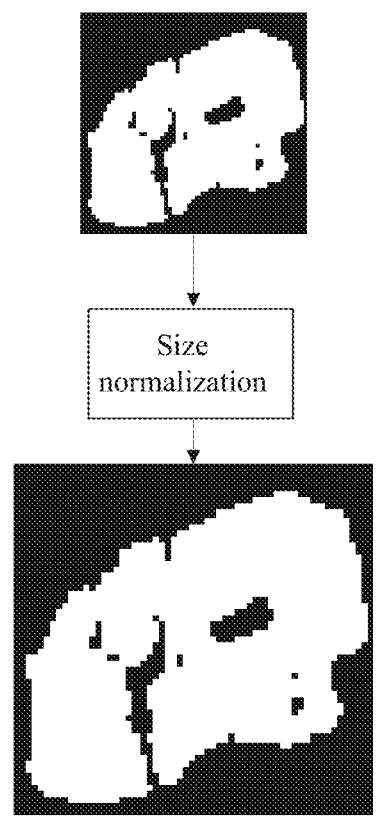
FIG. 5 is a schematic flowchart of performing size normalization processing according to an embodiment of the present application.

The results after the size normalization can be seen in FIG. 5.

Next, the processing unit 101b performs contour feature extraction processing of the object.

Figure 6:
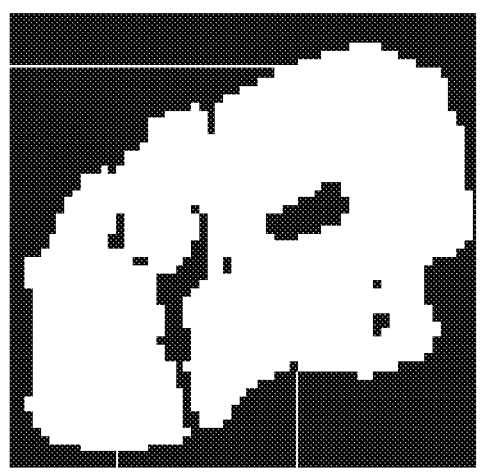
FIG. 6 is a schematic view of outline scan lines according to an embodiment of the present application.

Starting from the upper left corner of the bounding rectangle of the object that has undergone size normalization, contour scan lines perpendicular to the rectangle's edges are drawn in the counterclockwise direction, and the distances of the scan lines between the rectangle's boundary and the object's contour are recorded and are used as contour characteristic values of the object, and 40+40+40+40=160 characteristic values can be counted in total. In practical applications, in order to reduce the amount of characteristic data, it is possible to store one characteristic value every four dots (the average of the lengths of 4 contour scan lines). This not only will greatly reduce the amount of data, but also can filter out the impact of some image noise points and characteristic data. FIG. 6 is a schematic view of contour scan lines, where the white lines represent the contour scan lines of points corresponding to the object's bounding rectangle.

Finally, the processing unit 101b performs a classification operation using a SVM classifier.

The extracted contour characteristics are normalized numerically, and the characteristic values are scaled to between 0 and 1. The characteristic values are input into a trained SVM classifier for a classification operation, and the type of the object is determined according to the output of the classifier.

It should be noted that, in addition to the above-described structuralization algorithm that does not set an object type, the following structuralization algorithms that set object type are also included according to the specific application: vehicle object structuralization algorithm (including license plate number identification, body color classification, vehicle sub-brand identification, etc.), person object structuralization algorithm (including height, age range, gender, whether glasses or not are worn, clothing color, etc.), moving object structuralization algorithm (including object type, moving speed, moving direction, position, etc.).

In step S230, the data transmission unit 101c transmits the video compression data and the foreground object metadata.

In summary, the video transmission device 101 of the present embodiment processes, respectively, the background image and the foreground moving object in the image before the video image is transmitted, that is, performs compression encoding on the background image to obtain the video compression data, and structuralizes the foreground moving object to obtain the foreground object metadata. Because the metadata is not video data, but structuralized semantic information, it can be transmitted as text or design data structures in the form of binary data. Therefore, the amount of video data is greatly reduced, and network bandwidth consumption can be further reduced.

Embodiment 2

Figure 7:
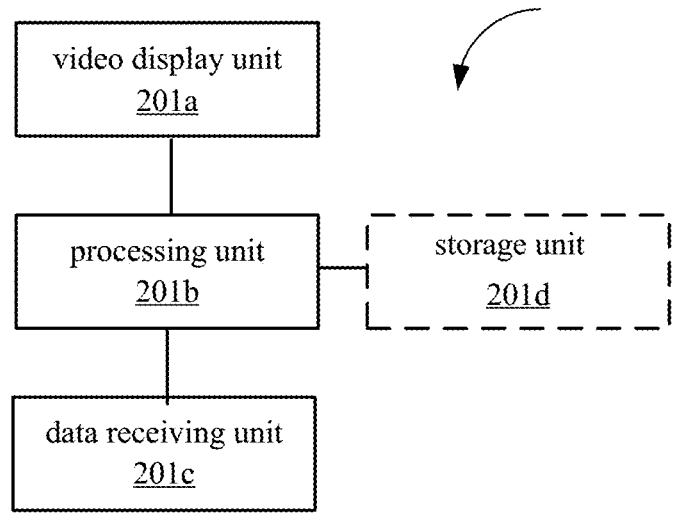
FIG. 7 is a schematic structural view of a video decoding device according to an embodiment of the present application.

FIG. 7 is a schematic structural view of a video decoding device according to an embodiment of the present application. The video decoding device 201 of the present embodiment can decode video compression data and foreground object metadata and display the image.

The device 201 includes a video display unit 201a, a processing unit 201b, and a data receiving unit 201c. The data receiving unit 201c receives the video compression data and the foreground object metadata transmitted from a data transmission unit 101c in a wired or wireless manner. The processing unit 201b decodes the video compression data and interprets the foreground object metadata. The video display unit 201a synthetically displays a decoded background image and an interpreted foreground moving object.

The processing unit 201b decodes background video data to obtain a background image, and the video display unit 201a displays the decoded background image. It should be noted that the decoding method used by the processing unit 201b corresponds to the method of encoding the background image, and the specific decoding process and decoding algorithm are not described here.

The processing unit 201b interprets the foreground object metadata to obtain a foreground image. Regarding how the processing unit 201b interprets the foreground object metadata, the present embodiment provides the following two methods.

In the method 1, the device 201 further includes a storage unit 201d that pre-stores pictures of various types of foreground objects. For example, if vehicles on a highway are monitored, the storage unit 201d can store a large number of pictures for vehicles of different colors, different models and different makes. When the processing unit 201b analyzes the received foreground object metadata, the picture of foreground object that conforms to or is closest to the metadata description can be identified from the pre-stored pictures in the storage unit 201d based on the information provided in the metadata and taken as the foreground moving object. The video display unit 201a superimposes the picture of the foreground object on the background image that has been decoded and displayed based on the object's position and the time at which the object appears described by the metadata, realizing the synthetic display of the background image and the foreground moving object.

Figure 8A:
FIGS. 8(a)-(c) are illustrative views of synthesis of a video image.
Figure 8B:
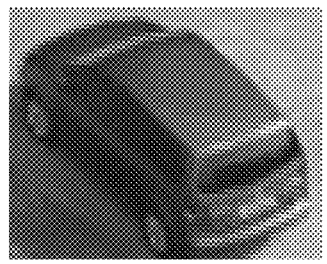
Figure 8C:

For example, FIG. 8(a) is a background image, assuming the metadata describes that there is a black, small car in a certain rectangular area at a certain moment, the make of which is Volkswagen, the sub-brand is Touran and the moving direction is towards the upper left at 45 degrees. According to the above metadata description, the corresponding picture (FIG. 8(b)) that is the closest to the moving foreground described in the metadata is identified among the pre-stored pictures. Then, the vehicle image of FIG. 8(b) is superimposed on the background image to obtain the rendering shown in FIG. 8(c).

Although there are some differences between the picture of foreground object obtained by this method and the actual foreground object, the method can quickly interpret the foreground object metadata, and data is processed relatively fast. In the case where moving objects are not required to be very clear, for example, when monitoring the traffic flow of cars, the method can very quickly get the desired results.

Alternatively, in the method 2, the processing unit 201b of the video display device 201 interprets the received foreground object metadata, and based on the information provided in the metadata, superimposes the foreground moving object described by the metadata directly on the background image that has been decoded and displayed through display plotting technology, realizing the synthetic display of the background image and the foreground image. This method does not need to store a large number of object pictures, and although the data processing speed is slower than the method 1, the object picture obtained is more accurate, and can accurately reproduce the original video image.

The display plotting technology includes technologies such as DirectDraw, Direct3D, and OpenGL, and in actual operation, as for special effects in films and television, is able to plot 2D/3D images relatively close to the real object.

Figure 9:
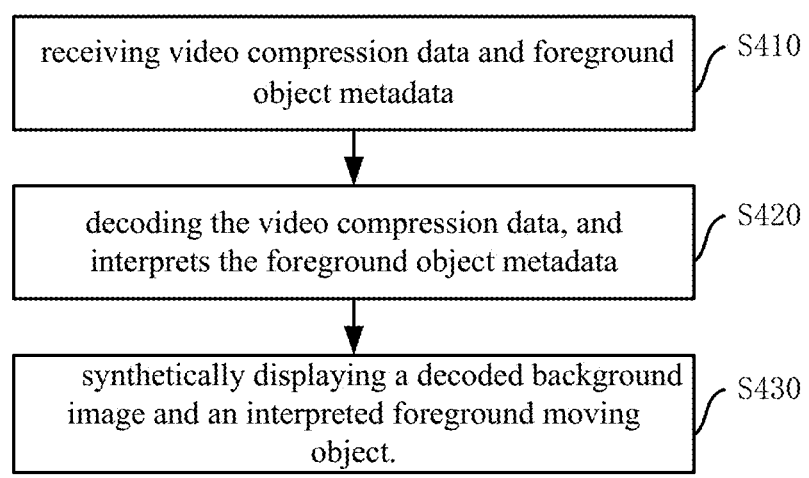
FIG. 9 is a schematic flowchart of a video decoding method according to an embodiment of the present application.

FIG. 9 shows a flow process of a video decoding method according to an embodiment of the present application. The method can be performed in the above-described device, and the method includes the following steps.

In step S410, a data receiving unit 201c receives video compression data and foreground object metadata.

In step S420, a processing unit 201b decodes the video compression data, and interprets the foreground object metadata.

In step S430, a data transmission unit 201a synthetically displays a decoded background image and an interpreted foreground moving object.

Example

FIGS. 10(a)-(f) are views illustrating the transmitting and displaying of a video image. The series of figures are used below to describe how a video image is transmitted and displayed.

Figure 10A:
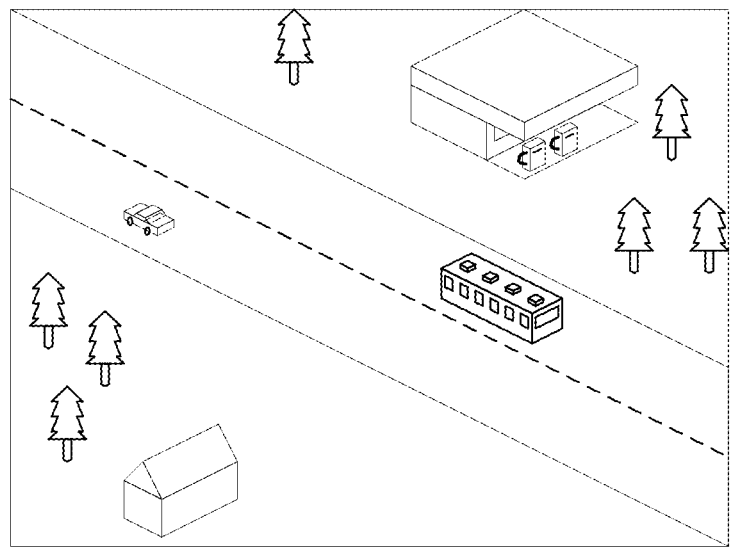
FIGS. 10(a)-(f) are illustrative views of transmitting and displaying of a video image.

As shown in FIG. 10(a), the image is a frame of a series of images acquired by a camera when monitoring a highway's traffic flow condition. Monitoring a highway's traffic flow condition is mainly concerned with information such as how many vehicles there are, and what are their respective models. The video image of FIG. 10(a) contains still scenes (such as trees and buildings) and moving objects (such as a small passenger car and a large passenger car).

Figure 10B:
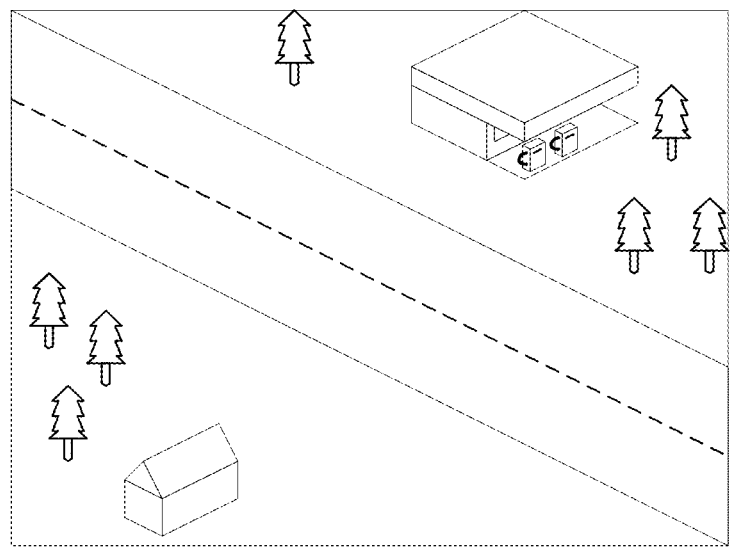
Figure 10B:
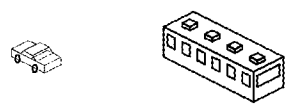

The frame of video image is separated into a background image containing only still scenes (as shown in the upper part of FIG. 10(b)) and a foreground image containing only moving objects, i.e. the small passenger car and the large passenger car (as shown in the lower part of FIG. 10(b)) according to a background model.

Figure 10C:
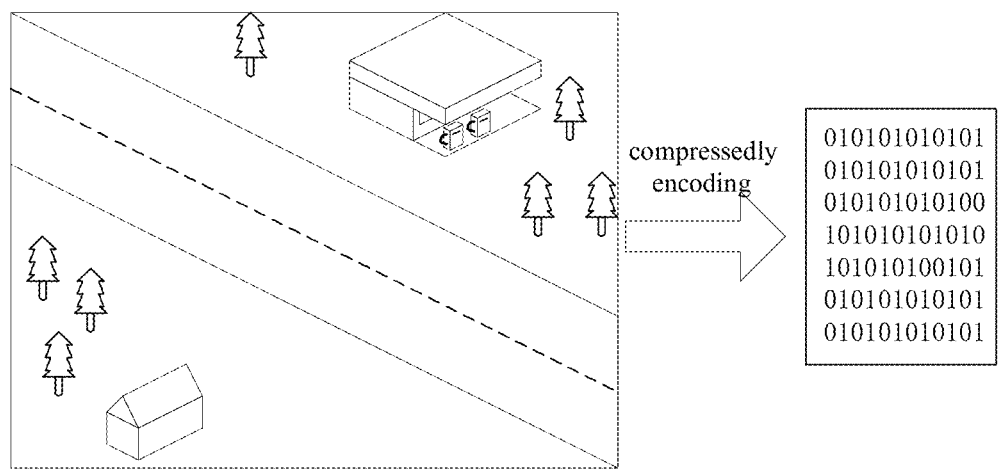
Figure 10D:
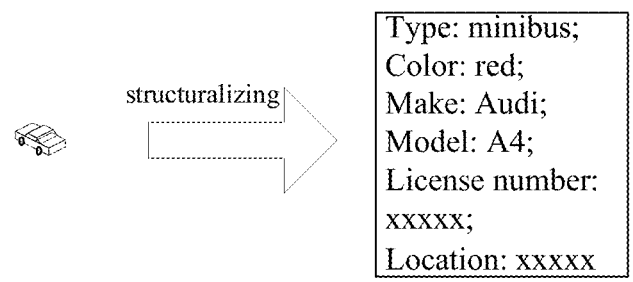
Figure 10D:
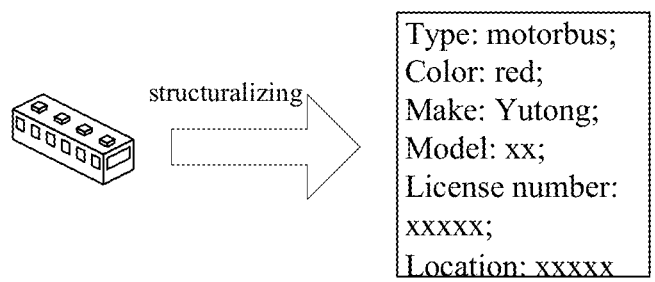

As shown in FIG. 10(c), the background image is encoded into video compression data in the form of digital array through compression encoding. Then, the images of the small passenger car and the large passenger car are respectively structuralized (see FIG. 10(d)). In this application scenario, foreground object metadata contains at least: the vehicle type, the vehicle color, the vehicle make, the vehicle model, the license plate number, the position of the foreground object in the frame of video image, and the time of the frame of video image. For the image of the small passenger car, the foreground object metadata obtained after the structuralization is: vehicle type: small passenger car; color: red; make: Audi; model: A4; license plate number: xxxxx; position: xxxxx; time: xxxxxx. For the image of the large passenger car, the foreground object metadata obtained after the structuralization is: vehicle type: large passenger car; color: red; make: Yutong; model: xx; license plate number: xxxxx; position: xxxxx; time: xxxxxx.

Figure 10E:
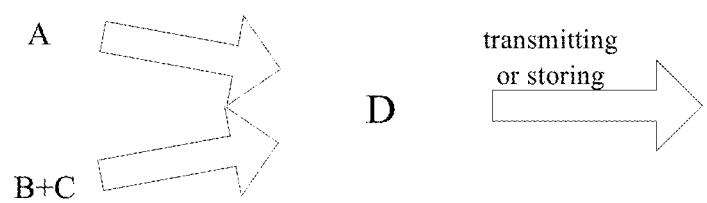

Then, referring to FIG. 10(e), the video compression data A and the foreground object metadata B+C are mixed to obtain a mixed stream D of video data with metadata, and the mixed stream D is transmitted or stored.

Figure 10F:
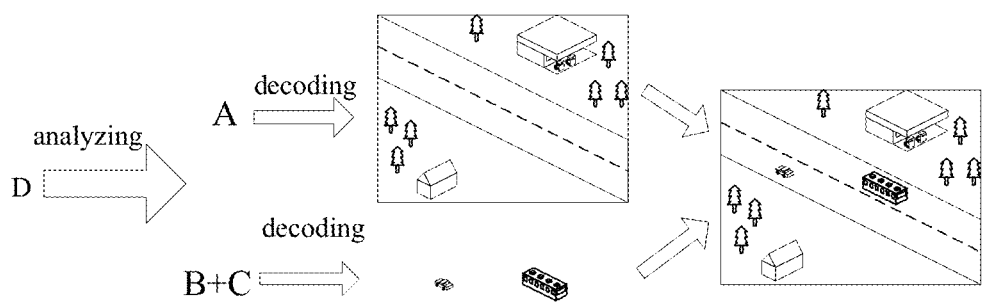

Finally, as shown in FIG. 10(f), the mixed stream D of video data with metadata is analyzed to obtain the video compression data A and the foreground object metadata B+C, and then the video compression data B is decoded to obtain a background image, and the foreground object metadata B+C is interpreted to obtain a foreground image. Finally, the foreground image is superimposed on the corresponding position of the background image based on the position information and the time information in the metadata for synthetic display, reproducing the captured video image.

In summary, the present application processes the background image and the foreground moving object in an image before the video image is transmitted, that is, it performs compression encoding on the background image to obtain video compression data, structuralizes the foreground moving object to obtain foreground object metadata. Because the metadata is not video data, but structuralized semantic information, it can be transmitted as text or design data structures in the form of binary data. Therefore, the amount of video data is greatly reduced, and network bandwidth consumption can be further reduced.

In order to solve the above-mentioned technical problems, embodiments of the present application also provide a storage medium, wherein the storage medium is for storing an application program for performing a video encoding method described in the present application when being executed. Wherein the video encoding method described in the present invention includes:

capturing a video image to be transmitted;

performing compression encoding on a background image in the video image to obtain video compression data, and structuralizing a foreground moving object in the video image to obtain foreground object metadata;

transmitting the video compression data and the foreground object metadata, wherein the foreground object metadata is data that stores video structuralized semantic information.

In order to solve the above-mentioned technical problems, embodiments of the present application also provide a storage medium, wherein the storage medium is for storing an application program for performing a video decoding method described in the present application when being executed. Wherein the video decoding method described the present invention includes:

receiving video compression data and foreground object metadata;

decoding the video compression data, and interpreting the foreground object metadata;

synthetically displaying a decoded background image and an interpreted foreground moving object.

In order to solve the above-mentioned technical problems, embodiments of the present application also provide a storage medium, wherein the storage medium is for storing an application program for performing a video encoding method for highways described in the present application when being executed. Wherein the video encoding method for highways described in the present invention includes:

capturing a video image on the highway;

separating a frame of the video image into a background image containing a still scene and a foreground image containing a moving object vehicle according to a background model;

performing compression encoding on the background image into video compression data in form of digital array, structuralizing the foreground image of the moving object vehicle to obtain foreground object metadata, wherein the foreground object metadata is data that stores video structuralized semantic information;

mixing the video compression data and the foreground object metadata to obtain a mixed stream of video data with metadata and transmitting the mixed stream.

In order to solve the above-mentioned technical problems, embodiments of the present application also provide a storage medium, wherein the storage medium is for storing an application program for performing a video decoding method for highways described in the present application when being executed. Wherein the video decoding method for highways described in the present invention includes:

analyzing a mixed stream of video data with metadata to obtain video compression data and foreground object metadata;

decoding the video compression data to obtain a background image, and interpreting the foreground object metadata to obtain a foreground image;

superimposing the foreground image on a corresponding position of the background image based on position information and time information in the metadata for synthetic display, reproducing the captured video image.

In order to solve the above-mentioned technical problems, embodiments of the present application also provide an application program for performing a video encoding method described in the present application when being executed. Wherein the video encoding method described in the present invention includes:

capturing a video image to be transmitted;

performing compression encoding on a background image in the video image to obtain video compression data, and structuralizing a foreground moving object in the video image to obtain foreground object metadata;

transmitting the video compression data and the foreground object metadata, wherein the foreground object metadata is data that stores video structuralized semantic information.

In order to solve the above-mentioned technical problems, embodiments of the present application also provide an application program for performing a video decoding method described in the present application when being executed. Wherein the video decoding method described in the present invention includes:

receiving video compression data and foreground object metadata;

decoding the video compression data, and interpreting the foreground object metadata;

synthetically displaying a decoded background image and an interpreted foreground moving object.

In order to solve the above-mentioned technical problems, embodiments of the present application also provide an application program for performing a video encoding method for highways described in the present application when being executed. Wherein the video encoding method for highways described in the present invention includes:

capturing a video image on a highway;

separating a frame of the video image into a background image containing a still scene and a foreground image containing a moving object vehicle according to a background model;

performing compression encoding on the background image into video compression data in form of digital array, structuralizing the foreground image of the moving object vehicle to obtain foreground object metadata, wherein the foreground object metadata is data that stores video structuralized semantic information;

mixing the video compression data and the foreground object metadata to obtain a mixed stream of video data with metadata and transmitting the mixed stream.

In order to solve the above-mentioned technical problems, embodiments of the present application also provide an application program for performing a video decoding method for highways described in the present application when being executed. Wherein the video decoding method for highways described in the present invention includes:

analyzing a mixed stream of video data with metadata to obtain video compression data and foreground object metadata;

decoding the video compression data to obtain a background image, and interpreting the foreground object metadata to obtain a foreground image;

superimposing the foreground image on a corresponding position of the background image based on position information and time information in the metadata for synthetic display, reproducing the captured video image.

In order to solve the above-mentioned technical problems, embodiments of the present application also provide an encoding device including a processor, a memory, a communication interface and a bus;

the processor, the memory and the communication interface are connected via the bus and communicate with each other;

the memory stores executable program codes;

the processor runs a program corresponding to the executable program codes by reading the executable program codes stored in the memory for:

capturing a video image to be transmitted;

performing compression encoding on a background image in the video image to obtain video compression data, and structuralizing a foreground moving object in the video image to obtain foreground object metadata;

transmitting the video compression data and the foreground object metadata, wherein the foreground object metadata is data that stores video structuralized semantic information.

In order to solve the above-mentioned technical problems, embodiments of the present application also provide a decoding device including a processor, a memory, a communication interface and a bus;

the processor, the memory and the communication interface are connected via the bus and communicate with each other;

the memory stores executable program codes;

the processor runs a program corresponding to the executable program codes by reading the executable program codes stored in the memory for:

receiving video compression data and foreground object metadata;

decoding the video compression data, and interpreting the foreground object metadata;

synthetically displaying a decoded background image and an interpreted foreground moving object.

In order to solve the above-mentioned technical problems, embodiments of the present application also provide an encoding device including a processor, a memory, a communication interface and a bus;

the processor, the memory and the communication interface are connected via the bus and communicate with each other;

the memory stores executable program codes;

the processor runs a program corresponding to the executable program codes by reading the executable program codes stored in the memory for:

capturing a video image on a highway;

separating a frame of the video image into a background image containing a still scene and a foreground image containing a moving object vehicle according to a background model;

performing compression encoding on the background image into video compression data in form of digital array, structuralizing the foreground image of the moving object vehicle to obtain foreground object metadata, wherein the foreground object metadata is data that stores video structuralized semantic information;

mixing the video compression data and the foreground object metadata to obtain a mixed stream of video data with metadata and transmitting the mixed stream.

In order to solve the above-mentioned technical problems, embodiments of the present application also provide a decoding device including a processor, a memory, a communication interface and a bus;

the processor, the memory and the communication interface are connected via the bus and communicate with each other;

the memory stores executable program codes;

the processor runs a program corresponding to the executable program codes by reading the executable program codes stored in the memory for:

analyzing a mixed stream of video data with metadata to obtain video compression data and foreground object metadata;

decoding the video compression data to obtain a background image, and interpreting the foreground object metadata to obtain a foreground image;

superimposing the foreground image on a corresponding position of the background image based on position information and time information in the metadata for synthetic display, reproducing the captured video image.

It will be understood by those skilled in the art that the various components of the computers and/or printers provided in the embodiments of the present application described above, as well as the steps in the methods, can be integrated on a single computing device or distributed over a network consisting of multiple computing devices. Alternatively, they can be realized by program codes executable by a computing device. Thus, they can be stored in a storage device to be executed by a computing device, or separately made into individual integrated circuit modules, or multiple modules or steps in them can be made into a single integrated circuit module. Thus, the present application is not limited to any specific combination of hardware and software.

It should be noted that, in the claims and the specification of the invention, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise(s) a . . . " do not exclude that there are other identical elements in the processes, methods, objects, or devices that comprise that element.

While the embodiments disclosed in this application are as described above, the description is merely for the purpose of facilitating the understanding of the technical solution of the present application and is not to limit the present invention. Any person skilled in the art in the field to which this application pertains can make any modification and change to the form and details of implementation without departing from the spirit and scope disclosed by the present application, but the scope of patent protection of the present application is still subject to the scope defined by the appended claims.

The invention claimed is:

1. A video encoding method, comprising:
    capturing a video image to be transmitted;
    performing compression encoding on a background image in the video image to obtain video compression data, and structuralizing a foreground image comprising a foreground moving object in the video image to obtain foreground object metadata comprising position information and time information;
    transmitting the video compression data and the foreground object metadata to a decoding device without transmitting the foreground image, so that the decoding device decodes the video compression data to obtain a background image, and interprets the foreground object metadata to obtain a foreground image, and superimposes the foreground image on a corresponding position of the background image based on the position information and time information in the metadata for synthetic display to reproduce the captured video image; wherein the foreground object metadata describes semantically the foreground object.

2. The method according to claim 1, wherein, it further comprises:
    establishing a background model of the video image and detecting the foreground moving object based on the established background model to separate the background image and the foreground moving object in a current frame of the video image.

3. The method according to claim 1, wherein,
    the video compression data corresponding to the background image is transmitted at a set time interval, and the foreground object metadata corresponding to the foreground moving object is transmitted in real time.

4. The method according to claim 1, wherein,
the structuralization algorithm used when structuralizing the foreground moving object in the video image includes structuralization algorithms that do not set object type and structuralization algorithms that set object type.

5. A video decoding method, comprising:
receiving, by a decoding device, video compression data and foreground object metadata that describes semantically a foreground image comprising a foreground object;
decoding the video compression data to obtain a background image and semantically interpreting the foreground object metadata to reproduce the foreground image;
synthetically displaying a decoded background image and the reproduced foreground image, comprising:
superimposing the foreground image on a corresponding position of the background image based on position information and time information in the metadata for synthetic display, reproducing the captured video image.

6. The method according to claim 5, wherein, synthetically displaying the decoded background image and the reproduced foreground image further comprises:
selecting a corresponding foreground object image from pre-stored images as the foreground moving object based on information of the foreground object metadata, and synthetically displaying the foreground object image and the decoded background image.

7. The method according to claim 5, wherein, synthetically displaying the decoded background image and the reproduced foreground image further comprises:
superimposedly plotting the foreground moving object described by the foreground object metadata on the decoded background image by means of display plotting technique based on the information of the foreground object metadata.

8. The method according to claim 1, wherein
capturing a video image to be transmitted comprises:
capturing a video image on a highway;
performing compression encoding on a background image in the video image to obtain video compression data and structuralizing a foreground image comprising a foreground moving object in the video image to obtain foreground object metadata comprises:
separating a frame of the video image into a background image containing a still scene and a foreground image containing a moving object vehicle according to a background model;
encoding the background image into video compression data in form of digital array through compression encoding, and structuralizing the foreground image of the moving object vehicle to obtain foreground object metadata, wherein the foreground object metadata is data that stores video structuralized semantic information;
transmitting the video compression data and the foreground object metadata without transmitting the foreground image, wherein the foreground object metadata describes semantically the foreground object and is semantically interpreted by the decoding device to reproduce the foreground image comprises:

mixing the video compression data and the foreground object metadata to obtain a mixed stream of video data with metadata and transmitting the mixed stream.

9. The method according to claim 8, wherein,
the foreground object metadata contains at least: vehicle type, vehicle color, vehicle brand, vehicle model, license plate number, position of the foreground object in the frame of the video image, and time of the frame of the video image.

10. The method according to claim 5, wherein, interpreting the foreground object metadata to reproduce the foreground image comprises:
selecting a corresponding foreground object image as a foreground moving object based on information of the foreground object metadata, or
superimposedly plotting a foreground moving object described by the foreground object metadata on the decoded background image by means of display plotting technique based on information of the foreground object metadata.

11. An encoding device, wherein, the encoding device comprises a processor, a memory, a communication interface and a bus;
the processor, the memory and the communication interface are connected via the bus and communicate with each other;
the memory stores executable program codes;
the processor runs a program corresponding to the executable program codes by reading the executable program codes stored in the memory for:
capturing a video image to be transmitted;
performing compression encoding on a background image in the video image to obtain video compression data, and structuralizing a foreground image comprising a foreground moving object in the video image to obtain foreground object metadata comprising position information and time information;
transmitting the video compression data and the foreground object metadata to a decoding device without transmitting the foreground image, so that the decoding device decodes the video compression data to obtain a background image, and interprets the foreground object metadata to obtain a foreground image, and superimposes the foreground image on a corresponding position of the background image based on the position information and time information in the metadata for synthetic display to reproduce the captured video image; wherein the foreground object metadata describes semantically the foreground object.

12. A decoding device, wherein, the decoding device comprises a processor, a memory, a communication interface and a bus;
the processor, the memory and the communication interface re connected via the bus and communicate with each other;
the memory stores executable program codes;
the processor runs a program corresponding to the executable program codes by reading the executable program codes stored in the memory for:
receiving, by a decoding device, video compression data and foreground object metadata that describes semantically a foreground image comprising a foreground object;
decoding the video compression data to obtain a background image and semantically interpreting the foreground object metadata to reproduce the foreground image;

synthetically displaying a decoded background image and the reproduced foreground image, comprising:

superimposing the foreground image on a corresponding position of the background image based on position information and time information in the metadata for synthetic display, reproducing the captured video image.

13. The encoding device according to claim 11, wherein capturing a video image to be transmitted comprises:

capturing a video image on a highway;

performing compression encoding on a background image in the video image to obtain video compression data and structuralizing a foreground image comprising a foreground moving object in the video image to obtain foreground object metadata comprises:

separating a frame of the video image into a background image containing a still scene and a foreground image containing a moving object vehicle according to a background model;

encoding the background image into video compression data in form of digital array through compression encoding, and structuralizing the foreground image of the moving object vehicle to obtain foreground object metadata, wherein the foreground object metadata is data that stores video structuralized semantic information;

transmitting the video compression data and the foreground object metadata to a decoding device without transmitting the foreground image, wherein the foreground object metadata describes semantically the foreground object and is semantically interpreted by the decoding device to reproduce the foreground image comprises:

mixing the video compression data and the foreground object metadata to obtain a mixed stream of video data with metadata and transmitting the mixed stream.

14. A video transmission and display system, comprising:

an encoding device wherein, the encoding device comprises a processor, a memory, a communication interface and a bus;

the processor, the memory and the communication interface are connected via the bus and communicate with each other;

the memory stores executable program codes;

the processor runs a program corresponding to the executable program codes by reading the executable program codes stored in the memory for: capturing a video image to be transmitted; performing compression encoding on a background image in the video image to obtain video compression data, and structuralizing a foreground image comprising a foreground moving object in the video image to obtain foreground object metadata comprising position information and time information; transmitting the video compression data and the foreground object metadata to a decoding device without transmitting the foreground image, so that the decoding device decodes the video compression data to obtain a background image, and interprets the foreground object metadata to obtain a foreground image, and superimposes the foreground image on a corresponding position of the background image based on the position information and time information in the metadata for synthetic display to reproduce the captured video image; wherein the foreground object metadata describes semantically the foreground object, and a decoding device wherein, the decoding device comprises a processor, a memory, a communication interface and a bus; the processor, the memory and the communication interface re connected via the bus and communicate with each other; the memory stores executable program codes;

the processor runs a program corresponding to the executable program codes by reading the executable program codes stored in the memory for:

receiving, by a decoding device, video compression data and foreground object metadata that describes semantically a foreground image comprising a foreground object;

decoding the video compression data to obtain a background image and semantically interpreting the foreground object metadata to reproduce the foreground image;

synthetically displaying a decoded background image and the reproduced foreground image, comprising:

superimposing the foreground image on a corresponding position of the background image based on position information and time information in the metadata for synthetic display, reproducing the captured video image.

* * * * *